Figure 1:
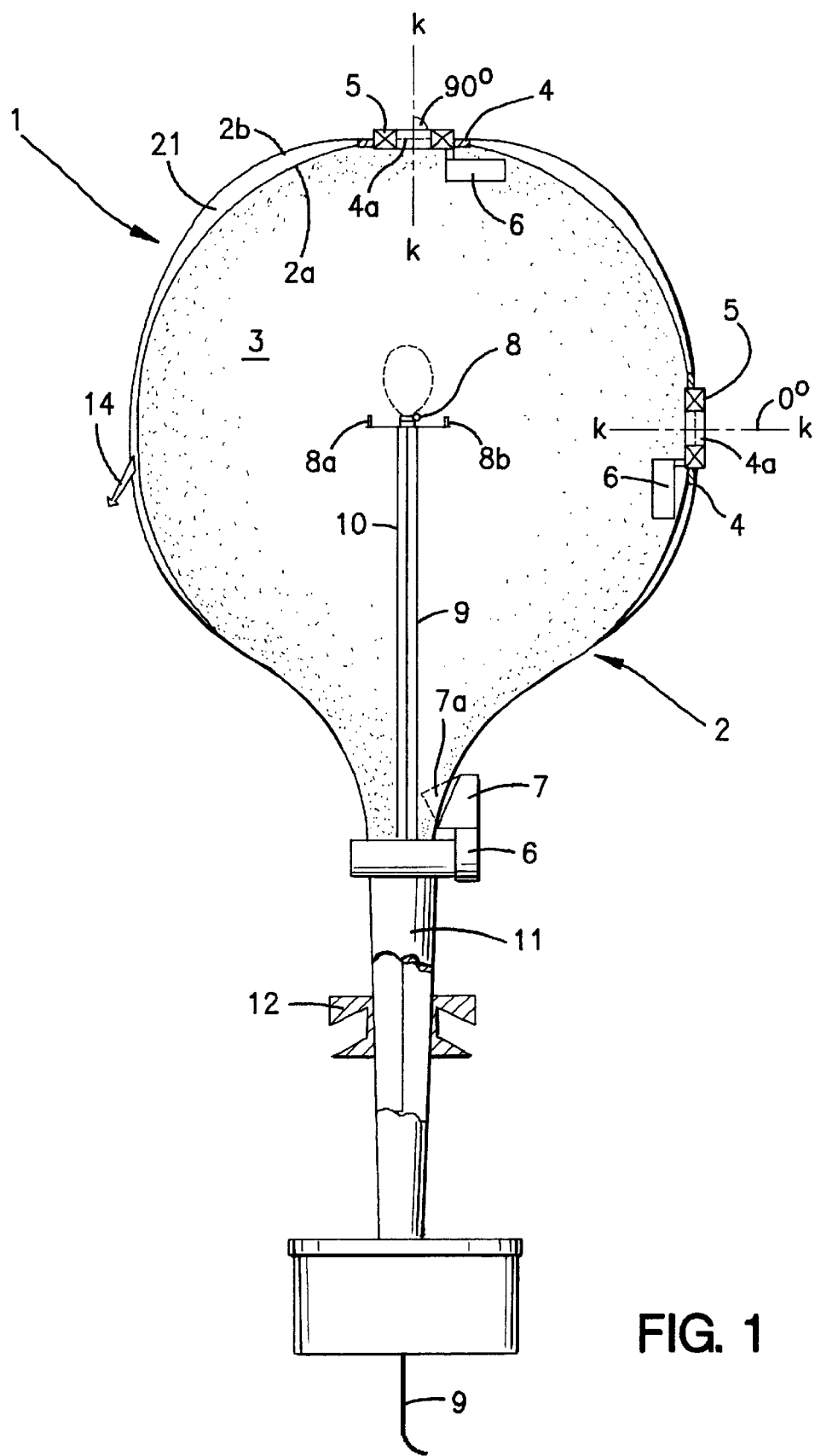

United States Patent
Carloni

[11] Patent Number: 5,931,412
[45] Date of Patent: Aug. 3, 1999

[54] AIR BALLOON CONTAINING INERT GAS

[76] Inventor: Franco Carloni, Residenza 51, Camorino, Switzerland, 6528

[21] Appl. No.: 08/817,885
[22] PCT Filed: Oct. 13, 1995
[86] PCT No.: PCT/IB95/00869
§ 371 Date: May 1, 1997
§ 102(e) Date: May 1, 1997
[87] PCT Pub. No.: WO96/15939
PCT Pub. Date: May 30, 1996

[30] Foreign Application Priority Data

Nov. 21, 1994 [CH] Switzerland ................ 3490/94

[51] Int. Cl.$^6$ .................................................. B64B 1/40
[52] U.S. Cl. ........................... 244/31; 244/33; 244/97
[58] Field of Search ................... 244/31, 33, 96, 244/97

[56] References Cited

U.S. PATENT DOCUMENTS

| | | |
|---|---|---|
| 2,383,390 | 8/1945 | Jacobs ........................ 244/33 |
| 2,619,303 | 11/1952 | Martin . | 
| 3,117,578 | 1/1964 | Borgeson et al. . |
| 3,836,817 | 9/1974 | Tchang et al. . |
| 3,839,631 | 10/1974 | Goddard . |
| 4,048,565 | 9/1977 | Rice ........................ 244/33 |
| 4,361,297 | 11/1982 | Pommereau et al. . |
| 4,382,210 | 5/1983 | Buhrer . |
| 4,688,758 | 8/1987 | Crosby . |
| 5,645,248 | 7/1997 | Campbell . |

FOREIGN PATENT DOCUMENTS

| | | |
|---|---|---|
| 0 184 262 | 6/1986 | European Pat. Off. . |
| 427 894 | 10/1924 | Germany . |
| 23 56 485 | 5/1975 | Germany . |
| 290 716 | 5/1928 | United Kingdom . |

Primary Examiner—Charles T. Jordan
Assistant Examiner—Tien Dinh
Attorney, Agent, or Firm—Young & Thompson

[57] ABSTRACT

In an air balloon (1) comprising a leak-tight casing (2) consisting of one or more layers containing an inert gas (3) that is lighter than air and provided with a part (4) designed to be opened reversibly to enable deflation of the said balloon (1), this part (4) is positioned such that the axis (K—K) perpendicular to its aperture (4a) is inclined to the horizontal at an angle between 0° and 180°, but perferably at an angle equivalent to 90°.

8 Claims, 2 Drawing Sheets

AIR BALLOON CONTAINING INERT GAS

This invention concerns air balloons, which, as is known, consist of a single or multiple skin casing and may have a light radiation source installed inside (fixed or flashing light) to render the balloon visible in the dark, to illuminate the ground underneath, etc. The deployment of these ballons, which use inert gases (such as argon and/or neon) for the aerostatic thrust, extends to various sectors such as rescue in the event of an accident or disaster, danger warnings, recognitions, etc.

In order to exchange the lamp contained inside a balloon provision has to be made to extract the lamp and the mount supporting it through an aperture, replace the lamp and re-insert the assembly in the casing, fixing this support in an appropriate manner. During such operations, among other things, the balloon has to be drained of the gas contained in it, with the consequent need to reinflate it with new inert gas, if available.

According to the present invention, on the contrary, a system is provided that renders it possible to exchange the lamp inside a balloon without any gas leakage.

The above lengthy, complicated and disadvantageous operations are eliminated with a balloon in accordance with this invention, which is designed to construct an air balloon consisting of a leaktight casing comprising one or more layers containing an inert gas that is lighter than air, and equipped with a part designed to be opened or closed in order to deflate the said balloon, characterized by the characterizing portion of attached claim 1.

Various other improvements are also covered by the subject of the invention, and they are described below, designed to make use of an air balloon easier and safer.

Many examples of prior art exist like Pat. U.S. Pat. No. 4,688,758 and German Patent No. DEA 427,894, but none of these discloses a balloon provided with means that allow to extract a lamp from its inside for replacement without causing any substantial leakage of inert gas.

Figure 2:
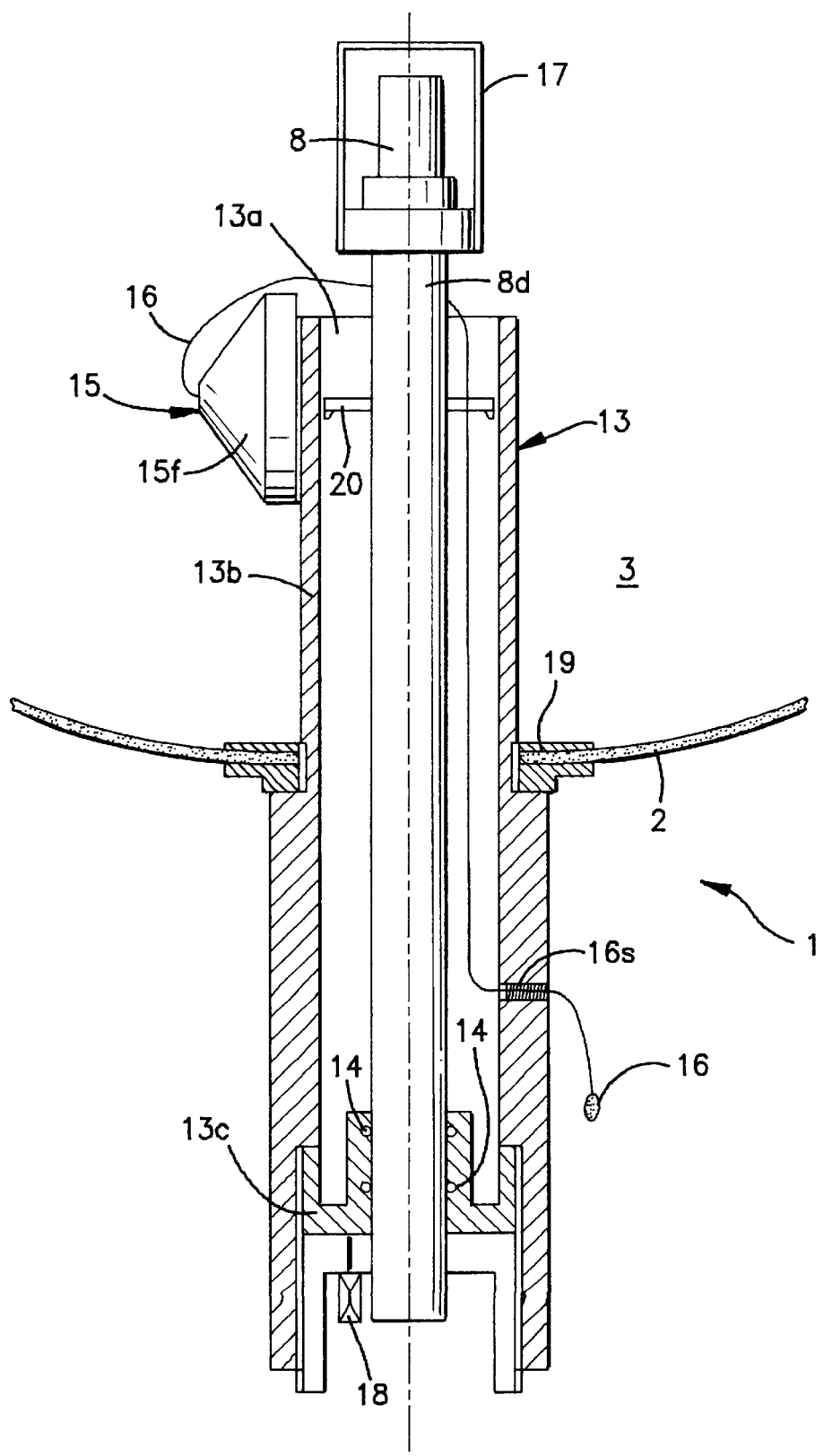

The advantages that may be achieved with a balloon constructed in accordance with the invention will be better understood during the course of the description which follows, in which reference is also made to the attached figures, which show the following:

FIG. 1: horizontal section of an air balloon equipped with various technical mechanisms proposed by the inventor;

FIG. 2: section view of a detail of the construction in which a lamp with a mount is positioned coaxially to a duct designed to enable extraction from the balloon.

Conventional high performance lamps generally used to illuminate the balloon are obviously of limited service life and, when one of these fails whilst the air balloon in which it is inserted is in use, the problem then arises that to replace it, access in needed inside the balloon and as said, it has to be virtually drained of nearly all the inert gas contained in it. Apart from the unnecessary waste of inert gas which is a disadvantage in financial terms, it may be that the user, for logistical reasons or due to the location of its use, may not have sufficient gas available to reinflate the balloon and in practical terms, this means forced discontinuation of use of the balloon for a greater of lesser period of time, which may have serious consequences in cases in which the balloon is used for the purposes of public safety, danger warnings, search for persons or other similar uses.

In order to eliminate the above disadvantages, the inventor of the present invention has provided for the use, for illumination of an air balloon 1, of a lamp 8 (see FIG. 2) fitted on a mount 8d of longitudinal extension lodged inside a cable duct 13 (made in two parts 13b, 13c in FIG. 2) integral with the attachment flange 19 of the said balloon 1 and directed towards the inside of the latter. When the lamp 8 is in use, it is positioned essentially in the middle of the balloon 1, outside the aforesaid duct 13 as shown in the figure, and if it has to be removed for any reason, this is done by sliding it, together with its mount 8d assisted also by a drilled coaxial disc or similar means, outside via the said duct 13, which is dimensioned accordingly. The lamp 8 can thus be removed easily from the balloon 1. In order to prevent the inert gas 3 from escaping and hence being wasted when sliding the lamp out, O-ring seals 14 are inserted on appropriate parts of the duct 13 and/or the mount 8d. In order to prevent loss of gas also when the lamp 8 has been fully removed together with its mount 8d from the balloon, the inventor has provided for fitting a plug 15 near to the aperture 13a of the duct which is inside the balloon, held in this position only temporarily by means of an adhesive, flexible or similar method (not shown), and is connected to a wire 16 which projects outside the balloon 1 through a hole with a leak-tight seal 16s. (The wire 16 may of course be positioned inside the duct 13). By pulling this wire, which is linked to the centre of the end of the tapered surface 15f of the said plug 15, the latter being facilitated by the angle of its tapered part, which is in the form of a cone for example, it then moves into position on the said aperture 13a of the duct and blocks it off, facilitated in this respect by the fact that the pressure inside the balloon is higher than the outside atmospheric pressure. This then means that the lamp 8 can be removed for inspection or replacement, without any appreciable loss of inert gas and, more importantly, without therefore having to stop using the balloon, other than for the short time it takes to perform the above operation.

As the lamps used normally reach very high temperatures, it is advisable for these to be switched on and/or left on only when in their final service position, in the middle of the balloon 1 and outside the duct 13. To ensure this, the inventor has provided for the incorporation of a micro-switch 18 in a suitable position between the said duct 13 and the said mount 8d of the lamp 8, to enable the supply to the said lamp 8 only when the said ducts 13 and mount 8d are in the relative preset position and this is normally when these have been fixed together by screws for example in the required position for the lamp 8 as described above for its service position.

This same microswitch 18 may also be used such that, in the position in which it prevents the electric current from reaching the lamp 8, at the same time it enables the illumination of a pilot lamp or warning display (not shown). By using this method, when the lamp to be removed is at a high temperature, a preliminary warning is provided, for example, advising a few minutes' wait before sliding it out through the duct 13 to remove it, in order to avoid the risk of damage to the latter.

The inventor has also envisaged the provision inside the lamp 8 of a transparent casing 17 made of quartz glass for example, fixed to the said mount 8d, designed to withstand a given internal pressure. In the not infrequent of the lamp exploding, this casing 17 prevents fragments of glass and the incandescent ball of gases emitted from the latter from penetrating inside the balloon 1 or its casing 2.

One of the disadvantages of air balloons in their present technological status lies in the fact that the inert gas contained inside them manages to pass, albeit slowly, through the skin or skins of the casing containing it due to their microporosity, thus reducing the volume of the balloon and its functionality. To avoid this disadvantage, the inventor of the present invention has provided for a predetermined quantity of air to be blown into a balloon 1 with a casing 2 made of 2 superimposed skins 2a and 2b, into the air space 21 between the two skins, at a pressure slightly higher than that of the inert gas contained in the inner skin 2a. The effect of this pressure is to offset the abovementioned outflow of the inert gas 3, thus prolonging the efficiency of the air balloon 1 in terms of time.

The above quantity of air can easily be introduced into the air space 13 by means of a pump of a known type, through a one-way valve for inflation 14, again of a known type.

One of the risks attached to the use of air balloons lies in the fact that if they escape the control of the operator, as a result of an incident or carelessness, these can travel, without any possibility of control, to altitudes so high that they in fact constitute a danger to air navigation.

To avoid this risk, the inventor has envisaged connection of the valve 5 which controls the said aperture 4a and an altimetric height recording device 6 designed to actuate it, causing evacuation of the gas 3 when a preset altitude reaches a value determined when the balloon is put into service, in line with different situations and locations.

To totally eliminate the risk even in the event of failure of the said valve 5, or in the event of the abovementioned technical measures not being implemented, the inventor has provided for another solution, consisting of a different system 7, again actuated by an altimetric recorder 6 designed to break the casing 2 after actuation by the said recording device 6 at a preset altitude, this break being sufficient to evacuate the gas 3 contained inside it at a prefixed speed. Breakage may be effected, for example, by means of a spike, a blade or even a micro-charge of high performance explosive. The drawing shows the solution involving a blade 7a.

The other possibilities are not shown in detail as these are easy for a technical expert in the sector to imagine.

Obviously, in both the cases described here, the associated equipment may be supplied by batteries incorporated in their containers.

Since, as mentioned above, an air balloon is, in the majority of cases, designed to contain a lamp 8 inside it, the inventor has provided for an ingenious and useful solution to achieve high luminous capability with low energy consumption. Based on the fact that so-called "neon" lamps merely consist of a casing containing a gas in essence identical to that used to inflate the air balloons and equipped with two pole shoes with a predetermined difference in potential between them, provision has been made for these pole shoes 8a, 8b to be located inside the balloon 1, supported by a mount 10 of conventional type. By adjusting the pressure and composition of the mixture of inert gases 3 used for inflation, by applying a preset difference in potential between the said pole shoes 8a, 8b (for example, by connecting these with conductors 9 contained in a sheath 11 to the electrical mains network in the area or to an autogenous source), an electric arc can be initiated between these such that the entire balloon 1 becomes a single lamp of very high power.

The visual or illuminating effect of the air balloon is thus increased or accentuated if appropriate synthetic materials are used to make the skin or skins forming the casing 2. The inventor recommends choosing the material for at least one of the said skins from the range of materials designed to refract or diffuse light radiation produced by the said electric arc in the required manner. As, in the presence of high humidity or heavy rain, the outer surface of all the constituent part of an air balloon 1, including the sheath 11 contains the cables of the conductors 9 which supply the pole shoes 8a, 8b or the lamp 8 become damp, a fine conductive layer is created which enables an electric discharge of high intensity to pass through it if the balloon should inadvertently come into contact with high voltage overhead lines or is struck by lightning.

This discharge, which causes a heavy current directed to earth, may damage the apparatus carried by the balloon, or in a worst case, may prove extremely dangerous for the operator.

To prevent such danger, the inventor has provided for the application, in the required position in respect to the sheath 11 containing the said conductor cables 9, of an insulator 12 as outlined in the sketch in the figure, designed to cut off the current as described by breaking up the layer of moisture described. This measure means that the air balloon can be handled under optimum conditions of safety in any situation.

The air balloon 1 shown in the figures is obviously an example acting as a guide for some of the possible constructions of the various parts of the balloon in accordance with the specifications in the present application for patent, but other different constructions remain within the scope of protection conferred by this application if these are obtained by following the provisions described in the attached claims.

I claim:

1. Air balloon (1) comprising a leak-tight casing (2) consisting of one or more layers containing an inert gas (3) that is lighter than air and provided with an aperture (4a) designed to be opened or closed in order to be able to deflate the said balloon (1), a lamp (8) inside the balloon fitted to a rigid mount (8d) of longitudinal extension and a cable duct (13) directed towards the inside of the balloon (1) and designed to enable the said lamp (8) fitted to its longitudinally extended rigid mount (8d) to pass through the said cable duct (13); the improvement comprising means (15, 16) that can be actuated from outside the balloon (1), designed to block off an aperture (13a) of the duct (13) situated inside the balloon (1) itself when the lamp (8) and its mount (8a) are fully removed therefrom.

2. Air balloon in accordance with claim 1, in which the said means that can be actuated from outside the balloon consist of a plug (15) with at least one tapered surface (15f), constructed and dimensioned such that when pulled by means of a wire (16) projecting outside the balloon (1) through a hole with a leak-tight seal (16s), the plug (15) moves over the aperture (13a) of the duct (13) situated inside the said balloon (1), blocking the aperture (13a) off and forming a seal as the pressure exerted on the plug (15) by the inert gas (3) is higher than that of the atmosphere.

3. Air balloon in accordance with claim 1, in which a microswitch (18) is interposed between the duct and the said rigid mount (8b) of the lamp (8), designed to enable electric supply to the lamp (8) only when this mount (8b) and the duct (13) are in the relative preset position.

4. Air balloon in accordance with claim 1, in which there is a protective casing (17) inside the lamp (8), this casing being made of quartz glass resistant to a given internal pressure.

5. Air balloon in accordance with claim 1, wherein the said lamp is substituted by two pole shoes (8a, 8b) designed to initiate an electric arc, when a given difference in potential is applied, through the inert gas (3) contained in the casing (2), at least one of the layers forming this latter being made from a material designed to refract and diffuse in the required manner light radiation produced by said electric arc.

6. Air balloon in accordance with claim 1, characterized by the fact that the said aperture (4a) is controlled by a valve (5) connected to a recording device (7) for the altimetric height designed to actuate said valve (5) causing opening and outflow of the said gas (3), when a predetermined altitude is reached.

7. Air balloon in accordance with claim 1, characterized by the fact that there is a device (6) fixed on the top which is actuated by an altimetric height recording device (7') when a preset altitude value is reached to break the said casing (2) enough to enable the gas (3) to escape at a predetermined speed.

8. Air balloon in accordance with claim 5, in which conductors (9) used to supply the lamp (8) or the pole shoes (8a, 8b) project from the casing (2) downwards and are lodged in a sleeve (11) fitted with an insulator device (12) to cut off a current of predetermined intensity directed to earth, passing over the outer surface of the casing (2) and the said sleeve (11).

* * * * *